US012153855B2

(12) United States Patent
Choi et al.

(10) Patent No.: US 12,153,855 B2
(45) Date of Patent: Nov. 26, 2024

(54) ELECTRONIC DEVICE, EXTERNAL ELECTRONIC DEVICE FOR AUDIO, AND METHOD FOR USING ANTENNA SIGNAL OF EXTERNAL ELECTRONIC DEVICE FOR AUDIO

(71) Applicant: Samsung Electronics Co., Ltd., Suwon-si (KR)

(72) Inventors: Byunggun Choi, Suwon-si (KR); Minseok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 495 days.

(21) Appl. No.: 17/480,678

(22) Filed: Sep. 21, 2021

(65) Prior Publication Data

US 2022/0004353 A1   Jan. 6, 2022

Related U.S. Application Data

(63) Continuation of application No. PCT/KR2020/006539, filed on May 19, 2020.

(30) Foreign Application Priority Data

May 27, 2019 (KR) ........................ 10-2019-0062137

(51) Int. Cl.
*G06F 3/16* (2006.01)
*H01Q 1/46* (2006.01)
*H04B 1/18* (2006.01)

(52) U.S. Cl.
CPC ............... *G06F 3/162* (2013.01); *H01Q 1/46* (2013.01); *H04B 1/18* (2013.01)

(58) Field of Classification Search
CPC .......... G06F 3/162; H01Q 1/46; H01Q 1/273; H01Q 1/44; H04B 1/18; H01R 24/60;
(Continued)

(56) References Cited

U.S. PATENT DOCUMENTS

2014/0184469 A1   7/2014   Yoshino et al.
2019/0058617 A1   2/2019   Kolsrud et al.
(Continued)

FOREIGN PATENT DOCUMENTS

JP    2008-099117 A     4/2008
KR    20-2010-0005902 U  6/2010
(Continued)

OTHER PUBLICATIONS

International Search Report dated Aug. 24, 2020 in connection with International Patent Application No. PCT/KR2020/006539, 2 pages.
(Continued)

*Primary Examiner* — Eugene Yun

(57) ABSTRACT

An electronic device, according to various embodiments, comprises: a connector configured to removably couple with a plug of an external audio device; a data signal line connected to at least one pin of the connector; and a processor, wherein the processor may be configured to identify a connection of the plug of the external audio device; and receive, through the data signal line, an audio signal from a codec connected to an antenna signal receiver in the external audio device. Additional various embodiments can be provided.

6 Claims, 9 Drawing Sheets

(58) Field of Classification Search
CPC .... H01R 2107/00; H04M 1/02; H04M 1/725; H04M 1/724; H04M 1/0274; H04M 2201/34
USPC ........................................................ 455/557
See application file for complete search history.

(56) References Cited

U.S. PATENT DOCUMENTS

| | | |
|---|---|---|
| 2020/0233632 A1 | 7/2020 | Smith |
| 2020/0280152 A1 | 9/2020 | Jeong et al. |
| 2021/0280974 A1 | 9/2021 | Yum |

FOREIGN PATENT DOCUMENTS

| | | |
|---|---|---|
| KR | 10-2014-0027227 A | 3/2014 |
| KR | 10-1648042 B1 | 9/2016 |
| KR | 10-2018-0020620 A | 2/2018 |
| KR | 10-2019-0091966 A | 8/2019 |

OTHER PUBLICATIONS

Written Opinion of the International Searching Authority dated Aug. 24, 2020 in connection with International Patent Application No. PCT/KR2020/006539, 7 pages.
Office Action dated Sep. 8, 2023, in connection with Korean Patent Application No. 10-2019-0062137, 12 pages.

| Pin | Name | Description |
|---|---|---|
| A1 | GND | Ground return |
| A2 | SSTXp1 | SuperSpeed differential pair #1, TX, positive |
| A3 | SSTXn1 | SuperSpeed differential pair #1, TX, negative |
| A4 | $V_{BUS}$ | Bus power |
| A5 | CC1 | Configuration channel |
| A6 | Dp1 | USB 2.0 differential pair, position 1, positive |
| A7 | Dn1 | USB 2.0 differential pair, position 1, negative |
| A8 | SBU1 | Sideband use (SBU) |
| A9 | $V_{BUS}$ | Bus power |
| A10 | SSRXn2 | SuperSpeed differential pair #4, RX, negative |
| A11 | SSRXp2 | SuperSpeed differential pair #4, RX, positive |
| A12 | GND | Ground return |

| Pin | Name | Description |
|---|---|---|
| B12 | GND | Ground return |
| B11 | SSRXp1 | SuperSpeed differential pair #2, RX, positive |
| B10 | SSRXn1 | SuperSpeed differential pair #2, RX, negative |
| B9 | $V_{BUS}$ | Bus power |
| B8 | SBU2 | Sideband use (SBU) |
| B7 | Dn2 | USB 2.0 differential pair, position 2, negative[a] |
| B6 | Dp2 | USB 2.0 differential pair, position 2, positive[a] |
| B5 | CC2 | Configuration channel |
| B4 | $V_{BUS}$ | Bus power |
| B3 | SSTXn2 | SuperSpeed differential pair #3, TX, negative |
| B2 | SSTXp2 | SuperSpeed differential pair #3, TX, positive |
| B1 | GND | Ground return |

FIG.5B

ELECTRONIC DEVICE, EXTERNAL ELECTRONIC DEVICE FOR AUDIO, AND METHOD FOR USING ANTENNA SIGNAL OF EXTERNAL ELECTRONIC DEVICE FOR AUDIO

CROSS-REFERENCE TO RELATED APPLICATIONS

This application is continuation of International Application No. PCT/KR2020/006539, filed on May 19, 2020, which claims priority to Korean Patent Application No. 10-2019-0062137 filed on May 27, 2019, in the Korean Intellectual Property Office, the disclosures of which are herein incorporated by reference in their entirety.

BACKGROUND

1. Field

Various embodiments relate to an electronic device, an external electronic device for audio, and a method for using an antenna signal of an external electronic device for audio, wherein an electronic device connected to an external electronic device for audio, which includes an antenna signal receiver, can receive an audio signal from the external electronic device for audio.

Various embodiments relate to an electronic device, an external electronic device for audio, and a method for using an antenna signal of an external electronic device for audio, wherein an external antenna signal (for example, a receiver radio signal or a DMB signal) is received by using an antenna included in an external electronic device for audio, and the antenna signal is converted to an audio signal, which is then transmitted to an electronic device connected to a connector of the external electronic device for audio.

Various embodiments relate to an electronic device, an external electronic device for audio, and a method for using an antenna signal of an external electronic device for audio, wherein an external antenna signal (for example, a receiver radio signal or a DMB signal) is received by using an antenna included in an external electronic device for audio, and the antenna signal is converted to an audio signal, which is then output by an audio device (for example, an audio output unit of an audio external electronic device).

2. Description of Related Art

An electronic device includes an ear jack (for example, 3.5 mm) to which an analog earphone may be connected. An audio signal may be output to the earphone connected through the ear jack of the electronic device, or an antenna signal may be received from the earphone through an antenna signal line included in the earphone.

In addition, recent electronic devices include USB Type-C receptacles, and audio signals may be output to earphones having USB Type-C plugs connected through the USB Type-C receptacles.

When an antenna signal (for example, a receiver radio signal or a DMB signal) is received by using an earphone including an antenna, noise may be generated by components (for example, codecs) included in the earphone, or noise may be generated by signals resulting from communication between the earphone and the electronic device. The noise may be applied to the antenna of the earphone, thereby seriously degrading the receiving performance of the antenna of the electronic device into which the earphone is inserted.

In addition, when a specific one of multiple pins included in a plug of an earphone including an antenna is used as an antenna pin, and if the electronic device into which the earphone is inserted does not support the specific pin used as the antenna pin, the electronic device can receive no antenna signal through the earphone, thereby degrading versatility of the earphone.

Various embodiments may provide an electronic device, an external electronic device for audio, and a method for using an antenna signal of an external electronic device for audio, wherein an electronic device connected to an external electronic device for audio, which includes an antenna signal receiver, can receive an audio signal, to which an antenna signal is converted, from the external electronic device for audio.

SUMMARY

According to various embodiments, an electronic device may include: a connector configured to removably couple with a plug of an external audio device; a data signal line connected to at least one pin of the connector; and a processor, wherein the processor is configured to identify a connection of the plug of the external audio device; and receive, through the data signal line, an audio signal from a codec connected to an antenna signal receiver in the external audio device.

According to various embodiments, an external audio device may include: an audio output; a plug configured to removably couple to a connector of an electronic device; a cable including an antenna signal line electrically connected to an antenna signal receiver and the audio output; the antenna signal receiver configured to receive an antenna signal generated using the antenna signal line and convert the received antenna signal into an audio signal; and a codec connected to the plug and the antenna signal receiver, wherein the codec is configured to recognize a connection of the connector for the electronic device to the plug, convert the audio signal from the antenna signal receiver, and transmit the converted audio signal to the electronic device connected through the plug.

According to various embodiments, a method for receiving an antenna signal by an electronic device may include: identifying a connection of a plug of an external audio device comprising an antenna signal receiver to a connector of the electronic device, and receiving, through a data signal line connected to at least one pin of the connector, an audio signal from a codec connected to the antenna signal receiver in the external audio device.

According to various embodiments, a method for transmitting an antenna signal by an external audio device may include: recognizing a connection of a connector for an electronic device removably coupled to a plug of the external audio device by a codec of the external audio device, the codec connected to the plug and antenna signal receiver of the external audio device, receiving, by the antenna signal receiver, an antenna signal generated using an antenna signal line included in a cable of the external audio device, the antenna signal line electrically connected between an antenna signal receiver and the audio output, converting, by the antenna signal receiver, the received antenna signal into an audio signal; converting, by the codec, the audio signal from the antenna signal receiver; and transmitting, by the codec, the converted audio signal to the electronic device through the plug.

According to various embodiments, a noise signal regarding an antenna signal (for example, a receiver radio signal or a DMB signal) may be improved by providing an external electronic device for audio, which includes an antenna signal receiver. For example, in the case of an electronic device including a receptacle of USB Type-C, an audio signal obtained by converting an antenna signal can be received through connection with an external electronic device for audio, which includes an antenna signal receiver, thereby securing versatility regarding the external electronic device for audio.

BRIEF DESCRIPTION OF THE DRAWINGS

FIGS. 5A and 5B illustrate a connector structure of an electronic device according to various embodiments.

DETAILED DESCRIPTION

Figure 1:
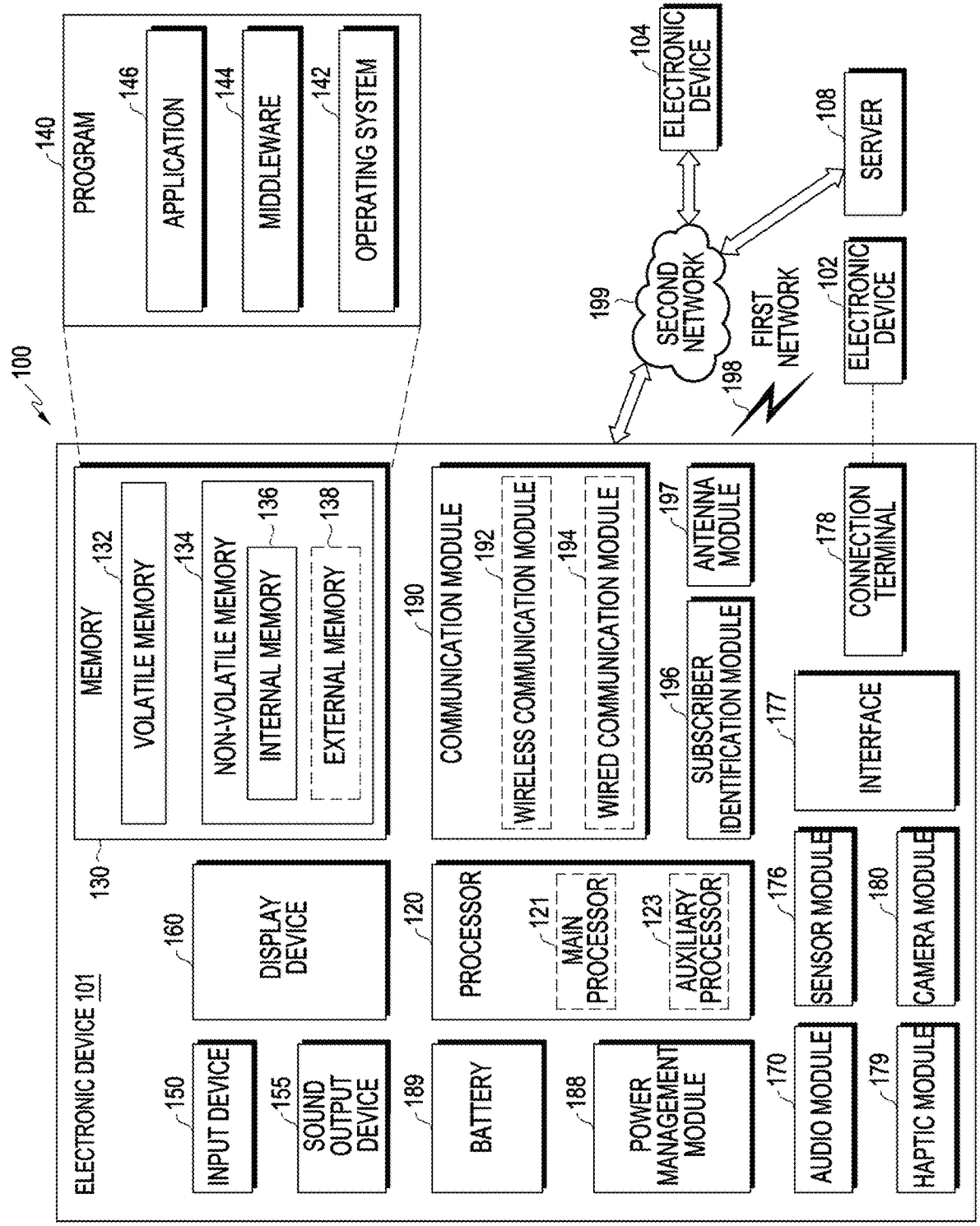
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
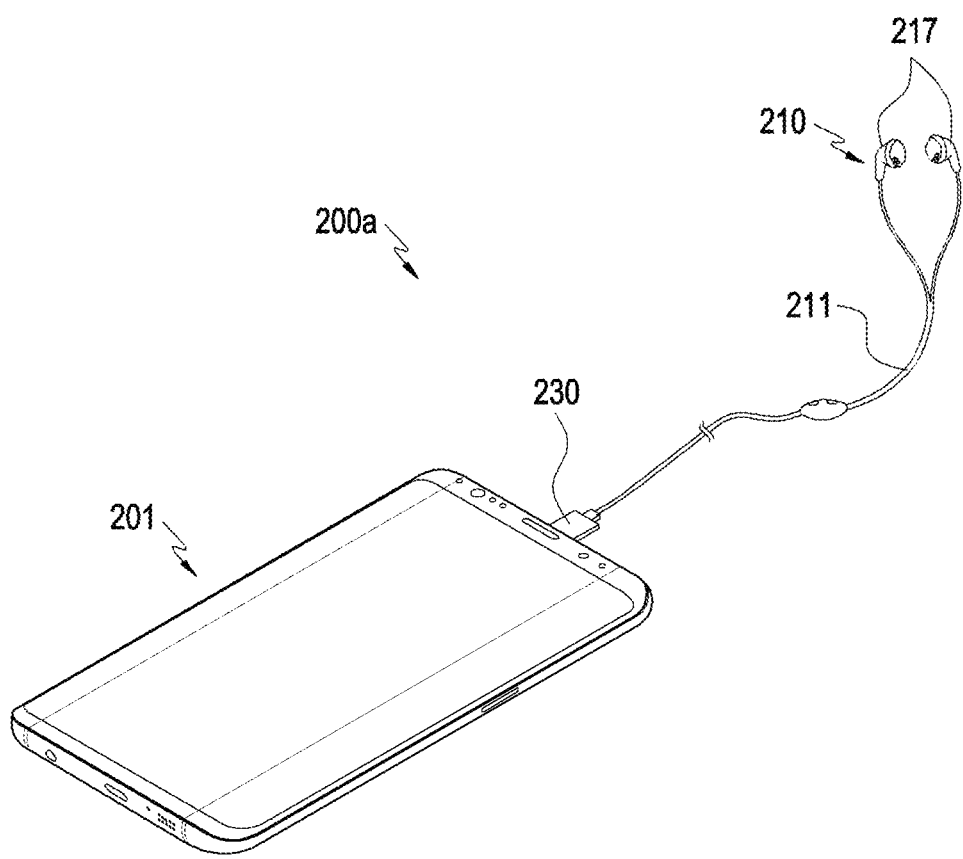
FIGS. 2A, 2B, and 2C are diagrams illustrating an electronic device and an external audio device according to various embodiments.
Figure 2B:
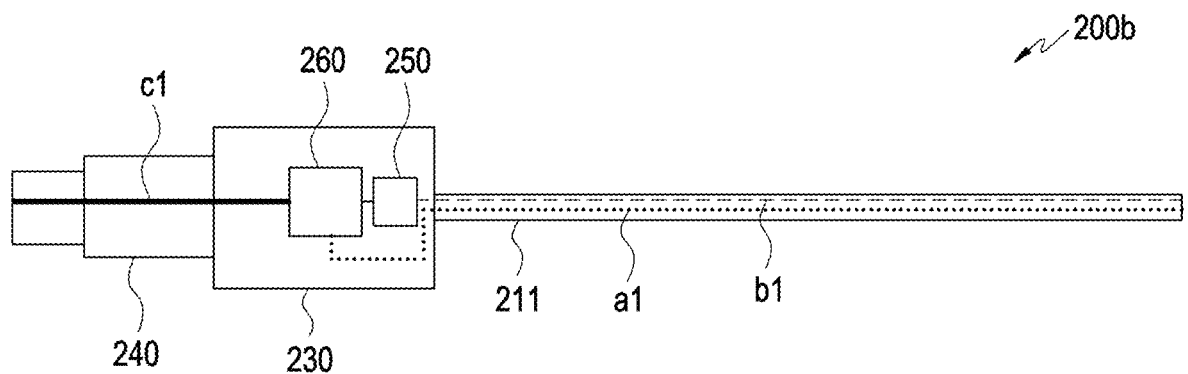
Figure 2C:
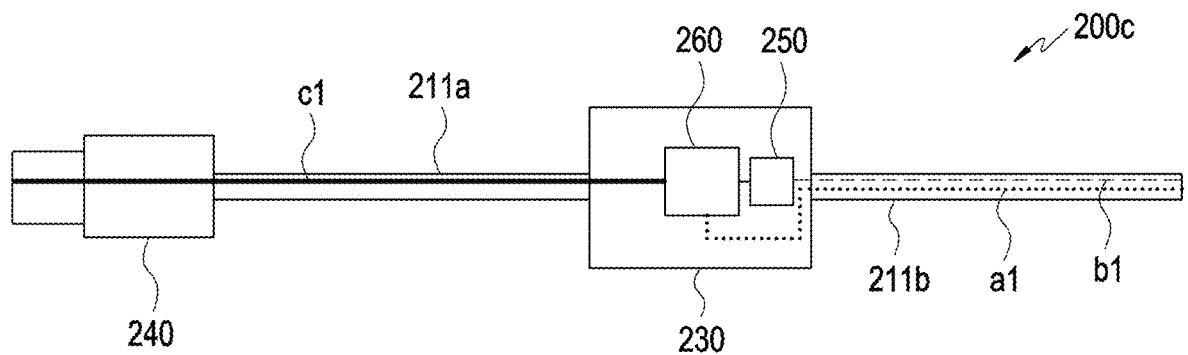

FIGS. 2A to 2C are diagrams 200a to 200c illustrating an electronic device and an external audio device according to various embodiments.

Referring to FIG. 2A, according to various embodiments, an electronic device 201 (e.g., the electronic device 101 of FIG. 1) may receive an audio signal obtained by converting an antenna signal (e.g., a receiver radio signal or DMB signal) from an external audio device 210.

According to an embodiment, the electronic device 201 may receive an audio signal obtained by converting an antenna signal from the external audio device 210 including an antenna signal receiver connected to a connector (e.g., a receptacle) of the electronic device.

According to an embodiment, the electronic device 201 may receive an encoded digital audio signal (e.g., a receiver digital audio signal) obtained by converting an antenna signal from the external audio device 210.

According to an embodiment, the connector of the electronic device may include a USB Type-C receptacle.

According to an embodiment, when an application using an antenna signal is executed, the electronic device 201 may receive an audio signal obtained by converting an antenna signal of the antenna signal receiver from a codec connected to the antenna signal receiver in the external audio device.

According to various embodiments, the external audio device 210 including the antenna signal receiver and the codec may transmit, to the electronic device, an audio signal obtained by converting an antenna signal (e.g., a receiver radio signal or DMB signal).

According to an embodiment, the external audio device 210 may include an audio output unit 217, a cable 211, a connector 230, and a connector (not shown) connected to the electronic device.

According to an embodiment, the audio output unit 217 may output two audio signals (an L signal and an R signal).

According to an embodiment, the cable 211 may include a microphone signal line, two audio signal lines (an L signal and an R signal), an antenna signal line, and a ground signal line.

According to an embodiment, the connector 230 may include the connector, the antenna signal receiver, the codec, and a plurality of signal pads connected to a plurality of signal lines included in the cable 211, respectively.

According to an embodiment, the antenna signal receiver of the connector 230 may receive an antenna signal generated using an antenna signal line among the plurality of signal lines included in the cable 211, and convert the received antenna signal into an analog audio signal (e.g., a receiver audio analog signal).

According to an embodiment, the codec of the connector 230 may convert an analog audio signal received from the antenna signal receiver into a digital audio signal (e.g., a receiver audio digital signal), and transmit the resulting packet data to the electronic device 201 connected to the external audio device 210.

According to an embodiment, the connector of the external audio device may include a USB Type-C plug.

Referring to FIG. 2B, the external audio device 210 may include a cable 211, a connector 230, and a plug 240.

According to various embodiments, the cable 211 may include an antenna signal line b1 and an audio output line al, and the antenna signal line b1 may exist between an audio output unit (e.g., the audio output unit 217 of FIG. 2A) and an antenna signal receiver 250 of the connector 230. The audio output line al may include an L signal output line and an R signal output line, and exist between the audio output unit (e.g., the audio output unit 217 of FIG. 2A) and a codec 260 of the connector 230.

According to various embodiments, the antenna signal line b1 for generating an antenna signal (e.g., a receiver radio signal) is connected to one side of the connector 230, and a data signal line c1 for transmitting, to an electronic device (e.g., the electronic device 201 of FIG. 2A), a digital audio signal (e.g., a receiver digital audio signal) obtained by converting an antenna signal is connected to the other side of the connector 230, so that the antenna signal line b1 and the data signal line c1 may be configured to be spaced apart from each other.

According to various embodiments, the connector 230 may include the antenna signal receiver 250 and the codec 260.

According to an embodiment, the antenna signal receiver 250 may exist between the antenna signal line b1 of the cable 211 and the codec 260, and convert an antenna signal (e.g., a receiver radio signal) received from the antenna signal line b1 into an analog audio signal (e.g., a receiver audio analog signal) and transmit the converted analog audio signal to the codec 260.

According to various embodiments, the codec 260 may exist between the antenna signal receiver 250 and the data signal line c1. The codec 260 may convert an analog audio signal received from the antenna signal receiver 250 into an encoded digital audio signal (e.g., a receiver audio digital signal), and transmit the encoded digital audio signal to the electronic device (e.g., the electronic device 201 of FIG. 2A) connected to the plug 240, through the data signal line c1 in the form of packet data.

According to an embodiment, the codec 260 may exist between the audio output line al of the cable 211 and the data signal line c1. The codec 260 may receive a digital audio signal (e.g., an FM digital audio signal audio-processed by an electronic device) received from the electronic device (e.g., the electronic device 201 of FIG. 2A) through the data signal line c1, convert the digital audio signal into an analog audio signal, and transmit the analog audio signal to the audio output unit (e.g., the audio output unit 217 of FIG. 2A) through the audio output line al.

According to various embodiments, at least a part of a plurality of pins included on one side of the plug 240 and at least a part of pins included in the codec 260 may be connected through the data signal line c1.

According to an embodiment, a plurality of pins included on the other side of the plug 240 may be connected to a plurality of pins included in a connector of the electronic device.

Referring to FIG. 2C, the external audio device 210 may include a first cable 211a, a second cable 211b, a connector 230, and a plug 240.

According to various embodiments, the first cable 211a may include a data signal line c1 and exist between the plug 240 and a codec 260 of the connector 230. The data signal line c1 may transmit an encoded digital audio signal (e.g., an FM audio digital signal) received from the codec 260 to an electronic device (e.g., the electronic device 201 of FIG. 2A) connected to the plug 240.

According to various embodiments, the second cable 211*b* may include an antenna signal line b1 and an audio output line a1, and the antenna signal line b1 may exist between an audio output unit (e.g., the audio output unit 217 of FIG. 2A) and an antenna signal receiver 250 of the connector 230. The audio output line a1 may include an L signal output line and an R signal output line, and exist between the audio output unit (e.g., the audio output unit 217 of FIG. 2A) and the codec 260 of the connector 230.

According to various embodiments, the antenna signal line b1 for generating an antenna signal (e.g., an FM radio signal) is connected to one side of the connector 230, and the data signal line c1 for transmitting an encoded digital audio signal (e.g., an FM digital audio signal) to the electronic device (e.g., the electronic device 201 of FIG. 2A) is connected to the other side of the connector 230, so that the antenna signal line b1 and the data signal line c1 may be configured to be spaced apart from each other.

According to various embodiments, the connector 230 may include the antenna signal receiver 250 and the codec 260.

According to an embodiment, the antenna signal receiver 250 may exist between the antenna signal line b1 of the second cable 211*b* and the codec 260, and convert an antenna signal (e.g., an FM radio signal) received from the antenna signal line b1 into an analog audio signal (e.g., an FM audio analog signal) and transmit the converted analog audio signal to the codec 260.

According to various embodiments, the codec 260 may exist between the antenna signal receiver 250 and the data signal line c1. The codec 260 may convert an analog audio signal received from the antenna signal receiver 250 into an encoded digital audio signal (e.g., an FM audio digital signal), and transmit the encoded digital audio signal to the electronic device (e.g., the electronic device 201 of FIG. 2A) connected to the plug 240 through the data signal line c1 in the form of packet data.

According to an embodiment, the codec 260 may exist between the audio output line a1 of the second cable 211*b* and the data signal line c1. The codec 260 may receive an encoded digital audio signal (e.g., a digital audio signal audio-processed by an electronic device) received from the electronic device (e.g., the electronic device 201 of FIG. 2A) through the data signal line c1, convert the digital signal into an analog audio signal, and transmit the analog audio signal to the audio output unit (e.g., the audio output unit 217 of FIG. 2A) through the audio output line a1.

According to various embodiments, at least a part of a plurality of pins included on one side of the plug 240 and at least a part of pins included in the codec 260 may be connected through the data signal line c1 included in the first cable 211*a*.

According to an embodiment, a plurality of pins included on the other side of the plug 240 may be connected to a plurality of pins included in a connector of the electronic device.

Figure 3:
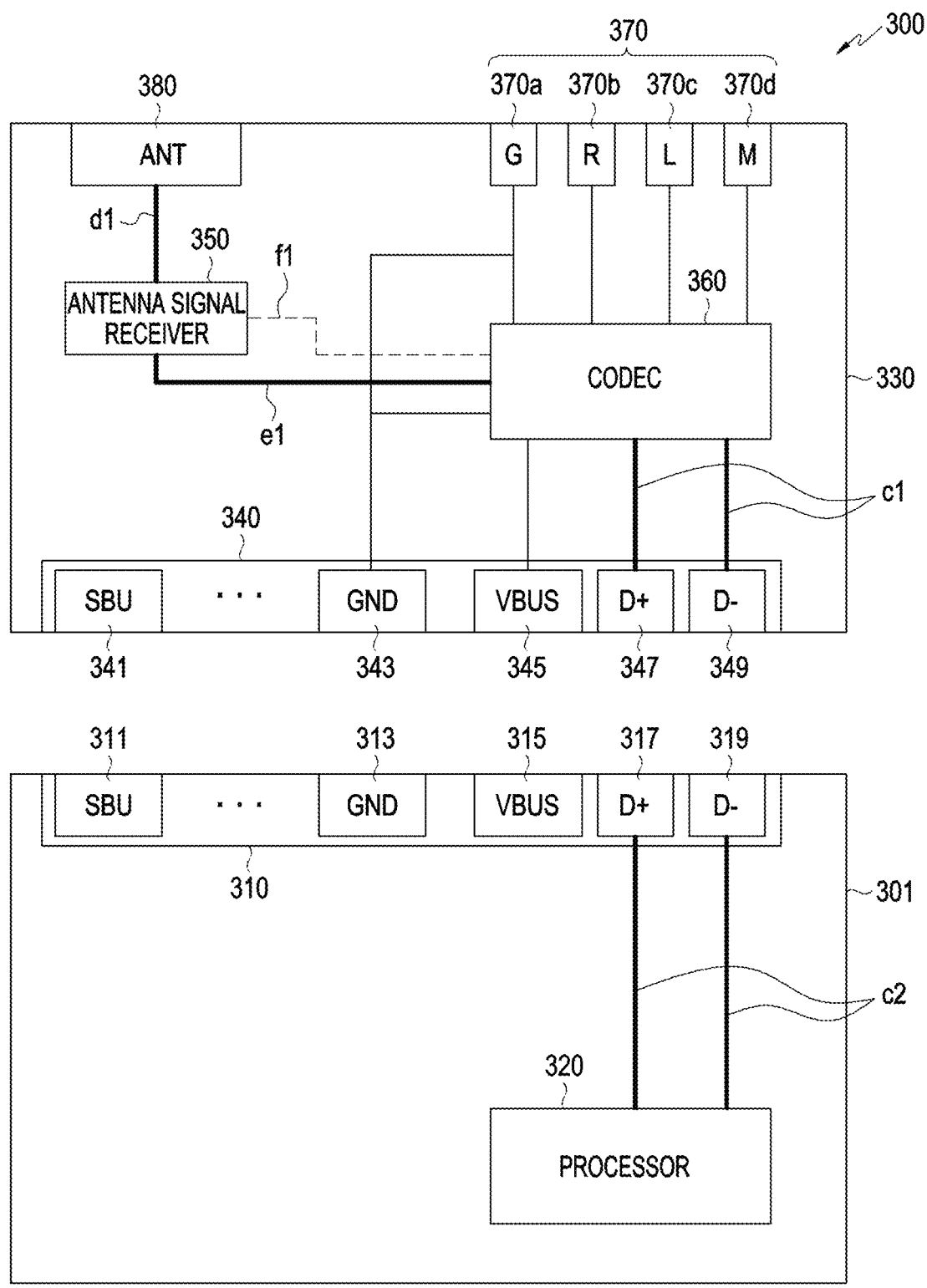
FIG. 3 is a diagram illustrating a configuration of a connector of an external audio device and an electronic device according to various embodiments.

FIG. 3 is a diagram illustrating a configuration 300 of a connector of an external audio device and an electronic device according to various embodiments.

Referring to FIG. 3, a connector 330 (e.g., the connector 230 of FIG. 2) of an external audio device (e.g., the external audio device 210 of FIG. 2) may include a plug 340, an antenna signal receiver 350, a codec 360, and a plurality of signal pads 370 and 380 respectively connected to a plurality of signal lines included in a cable (e.g., the cable 211 of FIGS. 2A and 2B). The external audio device may include: a first signal line d1 which transmits, to the antenna signal receiver 350, an antenna signal (e.g., an FM radio signal) received from an antenna pad 380 connected to an antenna signal line among the plurality of signal pads; and a second signal line e1 which can transmit an analog audio signal (e.g., an FM audio analog signal) of the antenna signal receiver 350 to the codec 360. The external audio device may include: data signal lines c1 which can transmit a digital audio signal (e.g., an FM audio digital signal) received from the codec 360 to an electronic device 301 through the plug 340; and a first control signal line f1 which can transmit an antenna operation request signal of the codec 360 to the antenna signal receiver 350.

According to various embodiments, the plug 340 may include a plurality of pins, and the plurality of pins may include a ground pin, a power supply pin, and data transmission/reception pins. In FIG. 3, although the plug 340 is described with a USB Type-C plug as an example, the connector is not limited to a USB Type-C plug and may be used in various types of plugs.

According to an embodiment, the plurality of pins included in the plug 340 may include a specific pin 341 (e.g., an SBU pin), a ground pin 343 (e.g., a GND pin), a power supply pin 345 (e.g., a VBUS pin), pins 347 and 349 (e.g., D+ and D−) for transmitting/receiving data, and the like.

According to various embodiments, the antenna signal receiver 350 may convert an antenna signal received from the antenna signal line into an audio signal and transmit the audio signal to the codec 360.

According to an embodiment, the antenna signal receiver 350 may receive an antenna signal (e.g., an FM radio signal), through the first signal line d1, from the antenna pad 380 (e.g., an FM ANT) connected to an antenna signal line (e.g., b1 of FIGS. 2B and 2C) included in the cable (e.g., the cable 211 of FIGS. 2A and 2B), among the plurality of signal pads 370 and 380. The antenna signal receiver 350 may convert the antenna signal (e.g., an FM radio signal) received through the first signal line d1 into an analog audio signal (e.g., an FM audio analog signal), and transmit the converted analog audio signal (e.g., an FM audio analog signal) to the codec 360 through the second signal line e1. According to an embodiment, the antenna signal receiver 350 may be activated in response to an antenna operation request signal received from the codec 360 through the first control signal line f1, and the activated antenna signal receiver 350 may receive an antenna signal (e.g., an FM radio signal) from the antenna signal line (e.g., b1 of FIGS. 2B and 2C) through the first signal line d1.

According to various embodiments, the codec 360 may convert an audio signal received from the antenna signal receiver 350 and transmit the converted audio signal to the electronic device 301.

According to an embodiment, the codec 360 may receive an analog audio signal (e.g., an FM audio analog signal) from the antenna signal receiver 350 through the second signal line e1, convert the received analog audio signal into an encoded digital audio signal (e.g., an FM audio digital signal and a USB audio signal), and transmit the converted digital audio signal to the electronic device 301 connected to the plug 340 through the data signal lines c1 in the form of packet data.

According to an embodiment, the codec 360 may recognize that the external audio device is connected to the electronic device 301 through at least one of the plurality of pins included in the plug 340.

According to an embodiment, the codec 360 may be connected to the antenna signal receiver 350 connected to the antenna signal line (e.g., b1 of FIGS. 2B and 2C), through the second signal line e1.

According to an embodiment, the codec 360 may transmit an encoded digital audio signal to the electronic device 301 through the data signal lines c1 connected to the data transmission/reception pins 347 and 349 (e.g., D+ and D−) among the plurality of pins of the plug 340.

According to an embodiment, when an antenna operation request signal is received from the electronic device 301 through the plug 340, the codec 360 may activate the antenna signal receiver 350 and receive an analog audio signal (e.g., an FM audio analog signal) from the activated antenna signal receiver 350 through the second signal line e1.

According to an embodiment, the codec 360 may receive an antenna operation request signal from the electronic device 301 through the data signal lines c1 connected to the data transmission/reception pins 347 and 349 (e.g., D+ and D−) among the plurality of pins of the plug 340.

According to an embodiment, the codec 360 may be connected to, among the plurality of signal pads 370 and 380, a ground pad 370a (e.g., a GND) connected to a ground signal line, two audio signal pads 370b and 370c (e.g., R and L) connected to two audio signal lines (e.g., an R signal and an L signal), respectively, and a microphone pad 370d (e.g., a MIC) connected to a microphone signal line.

According to an embodiment, when an encoded digital audio signal (e.g., a digital audio signal audio-processed in an electronic device) is received from the electronic device 301 through the data signal lines c1 connected to the data transmission/reception pins 347 and 349 (e.g., D+ and D−) among the plurality of pins of the plug 340, the codec 360 may convert the digital audio signal into an analog audio signal. The codec 360 may transmit the converted analog audio signal to two audio signal pads 370b and 370c (R and L) to which two audio output lines (an R signal line and an L signal line) included in the cable (e.g., the cable 211 of FIGS. 2B and 2C) are connected, respectively, and cause an audio output unit (e.g., the audio output unit 217 of FIG. 2) of the external audio device to output an audio signal.

According to various embodiments, among the plurality of signal pads 370 and 380 connected to the plurality of signal lines, the antenna pad 380 (e.g., an FM ANT) may be connected to the antenna signal receiver 350. Among the plurality of signal pads 370 and 380, the ground pad 370a (e.g., a GND) connected to the ground signal line, the two audio signal pads 370b and 370c (e.g., R and L) connected to the two audio output lines (e.g., an R signal and an L signal), respectively, and the microphone pad 370d (e.g., a MIC) connected to the microphone signal line may be connected to the codec 360.

According to an embodiment, the plurality of signal lines including the antenna signal line, the ground signal line, the two audio output lines, and the microphone signal line may be included in the cable (e.g., the cable 211 of FIGS. 2A and 2B) of the external audio device.

The electronic device (e.g., the electronic device 101 of FIG. 1 or the electronic device 201 of FIG. 2) may include a processor 320 and a connector 310.

According to various embodiments, the processor 320 (e.g., the processor 120 of FIG. 1) may receive an antenna signal from the codec 360 included in the connector 330 (e.g., the connector 230 of FIG. 2) of the external audio device (e.g., the external audio device 210 of FIG. 2).

According to an embodiment, the processor 320 may identify a connection of the external audio device through the connector 310. For example, the processor 320 may identify the connection of the external audio device, based on a resistance value indicating the external audio device received through an identification pin among a plurality of pins of the connector 310.

According to an embodiment, the processor 320 may control the codec 360 included in the connector 330 of the external audio device, so as to activate the antenna signal receiver 350.

According to an embodiment, when an application using an antenna signal among a plurality of applications of the electronic device is executed, the processor 320 may transmit an antenna operation request signal for activating the antenna signal receiver 350 to the codec 360 included in the connector 330 of the external audio device, through data signal lines c2 connected to data transmission/reception pins 317 and 319 (D+/D1) of the connector 310, and cause the codec 360 to activate the antenna signal receiver 350. The processor 320 may receive an encoded digital audio signal (e.g., an FM audio digital signal) from the codec 360 through the data signal lines c2.

According to an embodiment, the processor 320 may transmit an antenna operation request signal for activation of the antenna signal receiver 350 to the codec 360 through the data signal lines c2 connected to data transmission/reception pins 317 and 319 (e.g., D+ and D−) among the plurality of pins of the connector.

According to an embodiment, when an encoded digital audio signal (e.g., an FM audio digital signal) is received from the codec 360 included in the connector of the external audio device through the data signal lines c2, the processor 320 may decode the received digital audio signal, perform audio processing (e.g., volume control, filter application, an operation of mixing other audio sources, and the like) with respect to the decoded digital audio signal, and encode the digital audio signal on which the audio processing has been performed, so as to transmit the encoded digital audio signal to the codec 360.

According to an embodiment, the processor 320 may transmit an audio-processed digital audio signal to the codec 360 through the data signal lines c2 connected to the data transmission/reception pins 317 and 319 (e.g., D+ and D−) among the plurality of pins of the connector.

According to various embodiments, the connector 310 may include the plurality of pins, and the plurality of pins may include a specific pin, a ground pin, a power supply pin, and data transmission/reception pins.

According to an embodiment, the connector 310 may include a USB Type-C receptacle, and in the case of the USB Type-C receptacle, among the plurality of pins, a specific pin 311 (e.g., a SBU pin), a ground pin 313 (e.g., a GND pin), a power supply pin 315 (e.g., a VBUS pin), and data transmission/reception pins 317 and 319 (e.g., D+ and D−) may be included. The structure of the connector 310 of the electronic device may be described in detail through FIGS. 5A and 5B below.

Figure 4:
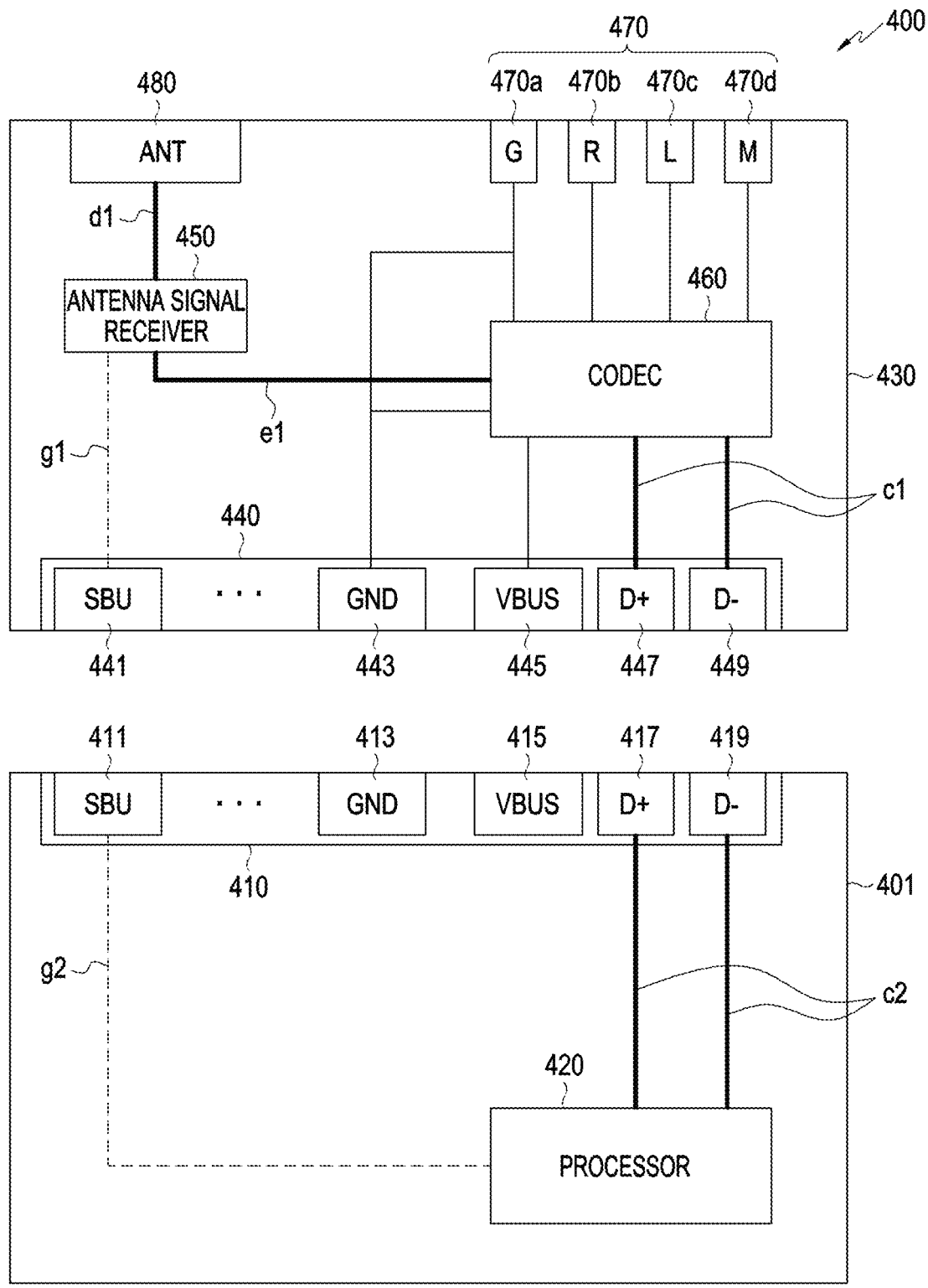
FIG. 4 is a diagram illustrating a configuration of a connector of an external audio device and an electronic device according to various embodiments.

FIG. 4 is a diagram illustrating a configuration 400 of a connector of an external audio device and an electronic device according to various embodiments. Referring to FIG. 4, a connector 430 (e.g., the connector 230 of FIG. 2) of an external audio device (e.g., the external audio device 210 of FIG. 2) may include a connector 440, an antenna signal receiver 450, a codec 460, and a plurality of signal pads 470 and 480 respectively connected to a plurality of signal lines included in a cable (e.g., the cable 211 of FIGS. 2A and 2B). The external audio device may include: a first signal line d1 for transmitting, to the antenna signal receiver 450, an antenna signal (e.g., an FM radio signal) received from an antenna pad 480 connected to an antenna signal line among the plurality of signal pads; and a second signal line e1 which can transmit an analog audio signal (e.g., an FM audio analog signal) of the antenna signal receiver 450 to the codec 460. The external audio device may include: data signal lines c1 which can transmit a digital audio signal (e.g., an FM audio digital signal and a USB audio signal) received from the codec 460 to an electronic device 401 through the connector 440; and a second control signal line g1 which can transmit an antenna operation request signal of the electronic device 401 to the antenna signal receiver 350.

According to various embodiments, the connector 440 may include a plurality of pins, and the plurality of pins may include a ground pin, a power supply pin, and data transmission/reception pins. In FIG. 4, although the connector 440 is described with a USB Type-C plug as an example, the connector is not limited to a USB Type-C plug and may be used in various types of plugs.

According to an embodiment, the plurality of pins included in the connector 440 may include a specific pin 441 (e.g., an SBU pin), a ground pin 443 (e.g., a GND pin), a power supply pin 445 (e.g., a VBUS pin), and data transmission/reception pins 447 and 449 (e.g., D+ and D−).

According to an embodiment, among the plurality of pins of the connector 440, the specific pin 441 (e.g., an SBU pin) may be connected to the antenna signal receiver 450 through the second control signal line g1, and may transmit an antenna operation request signal for activation of the antenna signal receiver 450, the signal received from the electronic device 401, to the antenna signal receiver 450 through the second control signal line g1.

According to various embodiments, the antenna signal receiver 450 may convert an antenna signal (e.g., an FM radio signal) received from an antenna signal line (b1 of FIGS. 2B and 2C) of a cable (the cable 211 of FIGS. 2B and 2C) into an analog audio signal (e.g., an FM audio analog signal), and transmit the converted analog audio signal to the codec 460.

According to an embodiment, the antenna signal receiver 450 may receive an antenna signal (e.g., an FM radio signal) from the antenna pad 480 (e.g., an FM ANT) connected to the antenna signal line included in the cable among the plurality of signal pads 470 and 480, convert the received antenna signal (e.g., an FM radio signal) into an analog audio signal (e.g., an FM audio analog signal), and transmit the converted analog audio signal to the codec 460.

According to an embodiment, the antenna signal receiver 450 may be activated in response to an antenna operation request signal received from the electronic device 401 through the second control signal line g1 connected to the specific pin 441 (e.g., an SBU pin) among the plurality of pins of the connector 440, and the activated antenna signal receiver 450 may receive an antenna signal (e.g., an FM radio signal) from the antenna signal line through the first signal line d1.

According to an embodiment, after the antenna signal receiver 450 is activated in response to the antenna operation request signal received from the electronic device 401, the antenna signal receiver may transmit, to the codec 460, a signal instructing preparation of antenna signal reception, through the second signal line e1 or a separate signal line (not shown).

According to various embodiments, the codec 460 may convert an audio signal received from the antenna signal receiver 450 and transmit the converted audio signal to the electronic device 401.

According to an embodiment, the codec 460 may receive an analog audio signal (e.g., an FM audio analog signal) from the antenna signal receiver 450 through the second signal line e1, convert the received analog audio signal into a digital audio signal (e.g., an FM audio digital signal), encode the converted digital audio signal, and transmit the resulting packet data to the electronic device 401 connected to the connector 440 through the data signal lines c1.

According to an embodiment, the codec 460 may recognize that the external audio device is connected to the electronic device 401 through the connector 440.

According to an embodiment, the codec 460 may be connected to the antenna signal receiver 450 connected to the antenna signal line, through the second signal line e1.

According to an embodiment, the codec 460 may receive an analog audio signal (e.g., an FM audio analog signal) from the antenna signal receiver 450 activated in response to the antenna operation request signal received from the electronic device 401 through the second control signal line g1 connected to the specific pin 441 (e.g., an SBU pin) among the plurality of pins of the connector 440.

According to an embodiment, the codec 460 may convert an analog audio signal (e.g., an FM audio analog signal) received from the antenna signal receiver 450 into a digital audio signal (e.g., an FM audio digital signal) and encode the converted digital audio signal. According to an embodiment, the codec 460 may transmit, to the electronic device 401, an encoded digital audio signal through the data signal lines c1 connected to the data transmission/reception pins 447 and 449 (e.g., D+ and D−) among the plurality of pins of the connector 440.

According to an embodiment, the codec 460 may be connected to, among the plurality of signal pads 470 and 480, a ground pad 470a (e.g., a GND) connected to a ground signal line, two audio signal pads 470b and 470c (e.g., R and L) connected to two audio output lines (e.g., an R signal and an L signal), respectively, and a microphone pad 470d (e.g., a MIC) connected to a microphone signal line.

According to an embodiment, when an encoded digital audio signal (e.g., a digital audio signal audio-processed in an electronic device) is received from the electronic device 401 through the data signal lines c1 connected to the data transmission/reception pins 447 and 449 (e.g., D+ and D−) among the plurality of pins of the connector 440, the codec 460 may decode the encoded digital audio signal and then convert the decoded digital audio signal into an analog audio signal. The codec 460 may transmit the converted analog audio signal to the two audio signal pads 470b and 470c (R and L) connected to the two audio output lines (e.g., an R signal line and an L signal line), respectively, and cause an audio output unit (e.g., the audio output unit 217 of FIG. 2) of the external audio device to output an audio signal.

According to various embodiments, among the plurality of signal pads 470 and 480 connected to the plurality of signal lines, an antenna signal pad 480 (e.g., an FM ANT) may be connected to the antenna signal receiver 450. According to an embodiment, among the plurality of signal pads 470 and 480, the ground pad 470a (e.g., a GND) connected to the ground signal line, the two audio signal pads 470b and 470c (e.g., R and L) connected to the two audio output lines (e.g., an R signal and an L signal), respectively, and the microphone pad 470d (e.g., a MIC) connected to the microphone signal line may be connected to the codec 460.

According to an embodiment, the plurality of signal lines including the antenna signal line, the ground signal line, the two audio output lines, and the microphone signal line may be included in the cable (e.g., the cable 211 of FIGS. 2A and 2B) of the external audio device.

The electronic device (e.g., the electronic device 101 of FIG. 1 or the electronic device 201 of FIG. 2) may include a processor 420 and a connector 410.

According to various embodiments, the processor 420 (e.g., the processor 120 of FIG. 1) may receive an antenna signal from the codec 460 included in the connector 430 (e.g., the connector 230 of FIG. 2) of the external audio device (e.g., the external audio device 410 of FIG. 2).

According to an embodiment, the processor 420 may identify a connection of the external audio device through the connector 410. For example, the processor 420 may identify the connection of the external audio device, based on a resistance value indicating the external audio device received through an identification pin among a plurality of pins of the connector 410.

According to an embodiment, the processor 420 may control the antenna signal receiver 450 included in the connector 430 of the external electronic device, so as to activate the antenna signal receiver 450.

According to an embodiment, when an application using an antenna signal among a plurality of applications of the electronic device is executed, the processor 420 may transmit an antenna operation request signal to the antenna signal receiver 450 included in the connector 430 of the external audio device, through a second control signal g2 connected to a specific pin 411 (e.g., an SBU pin) among the plurality of pins included in the connector 410, and activate the antenna signal receiver 450.

According to an embodiment, the processor 420 may transmit, to the codec 460, a signal instructing the electronic device to prepare to transmit an antenna signal at the same time as or after the antenna operation request signal is received from the antenna signal receiver 450 included in the connector 430 of the external audio device through the second control signal g2.

According to an embodiment, the processor 420 may receive, from the codec 460, an encoded digital audio signal (e.g., an FM audio digital signal) through the data signal lines c1 in the form of packet data.

According to an embodiment, when an encoded digital audio signal (e.g., an FM audio digital signal) is received from the codec 460 included in the connector 430 of the external audio device, the processor 420 may decode the encoded digital audio signal, perform audio processing (e.g., volume control, filter application, an operation of mixing other audio sources, and the like) with respect to the decoded digital audio signal, and encode the digital audio signal on which the audio processing has been performed, so as to transmit the encoded digital audio signal to the codec 460.

According to an embodiment, the processor 420 may transmit an encoded digital audio signal to the codec 460 through the data signal lines c2 connected to data transmission/reception pins 417 and 419 (e.g., D+ and D−) among the plurality of pins of the connector.

According to various embodiments, the connector 410 may include the plurality of pins, and the plurality of pins may include a specific pin, a ground pin, a power supply pin, and data transmission/reception pins.

According to an embodiment, the connector 410 may include a USB Type-C receptacle, and in the case of the USB Type-C receptacle, among the plurality of pins, a specific pin 411 (e.g., a SBU pin), a ground pin 413 (e.g., a GND pin), a power supply pin 415 (e.g., a VBUS pin), and data transmission/reception pins 417 and 419 (e.g., D+ and D−) may be included.

The structure of the connector 410 of the electronic device may be described in detail through FIGS. 5A and 5B below.

Figure 5A:
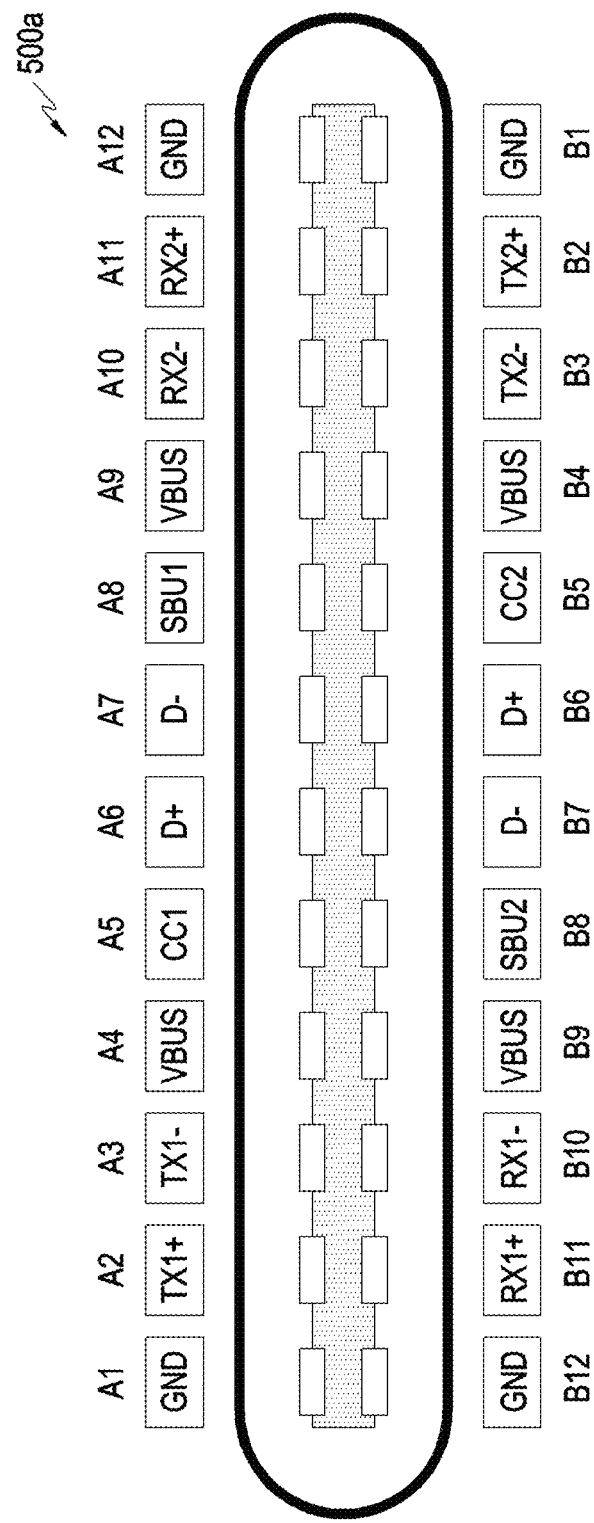

FIGS. 5A and 5B illustrate connector structures 500a and 500b of an electronic device according to various embodiments. FIGS. 5A and 5B illustrate a structure of a USB Type-c connector.

According to FIGS. 5A and 5B, a connector (e.g., the connector 310 of FIG. 3 or the connector 410 of FIG. 4) may include GND pins A1, A12, B1, and B12, TX+/TX-pins A2, A3, B2, and B3, VBUS pins A4, A9, B4, and B9, CC pins A5 and B5, D+/D-pins A6, A7, B6, and B7, SBU pins A8 and B8, and RX+/RX-pins A10, A11, B10, and B11.

The TX+/TX-pins A2, A3, B2, and B3 are pins for a SuperSpeed data bus capable of fast transmission, the VBUS pins A4, A9, B4, and B9 are pins for USB cable charging power, and the CC pins A5 and B5 are identification pins. The D+/D-pins A6, A7, B6, and B7 are pins for different bidirectional USB signals, the SBU pins A8 and B8 are pins which can be used for various purposes (e.g., an audio signal, a display signal, etc.) for extras, and the RX+/RX-pins A10, A11, B10, and B11 are pins for a SuperSpeed data bus capable of fast reception.

According to various embodiments, a specific pin among a plurality of pins included in a USB Type-c connector (e.g., the connector 410 of FIG. 4), for example, an SBU pin A8 or B8, which can be used for various purposes for extra, may be used as a pin for transmitting an antenna operation request signal to an antenna signal receiver (e.g., the antenna signal receiver 450 of FIG. 4) of an external audio device. According to an embodiment, a specific pin (e.g., an SBU pin 411) among a plurality of pins included in a connector (e.g., the connector 410 of FIG. 4) of an electronic device may transmit an antenna operation request signal for activation of the antenna signal receiver (e.g., the antenna signal receiver 450 of FIG. 4) as a specific pin (e.g., an SBU pin 441) connected to the antenna signal receiver (e.g., the antenna signal receiver 450 of FIG. 4) among a plurality of pins included in a connector (e.g., the connector 440 of FIG. 4) of the external audio device.

According to various embodiments, the electronic device (e.g., the electronic device 101 of FIG. 1, the electronic device 201 of FIG. 2, the electronic device 301 of FIG. 3, or the electronic device 401 of FIG. 4) may include a connector (e.g., the connector 310 of FIG. 3 or the connector 410 of FIG. 4) configured to removably couple with a plug of an external audio device, a data signal line (e.g., c2 of FIG. 3 or c2 of FIG. 4) connected to at least one pin of the connector, and a processor (e.g., the processor 320 of FIG. 3 or the processor 420 of FIG. 4), and the processor may be configured to identify a connection of the plug of the external audio device, and receive, through the data signal line, an audio signal from a codec connected to an antenna signal receiver in the external audio device.

According to various embodiments, the processor may be configured to, identify execution of an application in the electronic device that uses an antenna signal, in response to identifying the execution of the application using the antenna signal, transmit an antenna operation request signal to the codec such that the codec of the external audio device activates the antenna signal receiver of the external audio device to receive the antenna signal, and receive, from the codec, the audio signal converted from the antenna signal by the antenna signal receiver.

According to various embodiments, the processor may be configured to, identify execution of an application in the electronic device that uses an antenna signal, in response to identifying the execution of the application using the antenna signal, transmit an antenna operation request signal to the antenna signal receiver of the external audio device through a specific pin of the connector in order to activate the antenna signal receiver to receive the antenna signal, and receive, from the codec, the audio signal converted from the antenna signal of the antenna signal receiver.

According to various embodiments, the audio signal received from the codec of the external audio device may include a digital audio signal received as packet data, and the codec may be configured to convert an analog audio signal received from the antenna signal receiver into the digital audio signal.

According to various embodiments, the processor may be configured to perform audio processing on the received audio signal and transmit the audio signal on which the audio processing has been performed to the external audio device.

According to various embodiments, an external audio device may include an audio output (e.g., the audio output unit 270 of FIG. 2), a plug (e.g., the plug 340 of FIG. 3 or the plug 440 of FIG. 4) configured to removably couple to a connector of an electronic device, a cable (e.g., the cable 211 of FIGS. 2B and 2C) including an antenna signal line (e.g., b1 of FIGS. 2B and 2C) electrically connected between an antenna signal receiver (e.g., the antenna signal receiver 350 of FIG. 3 or the antenna signal receiver 450 of FIG. 4) and the audio output, the antenna signal receiver which receives an antenna signal generated using the antenna signal line and converts the received antenna signal into an audio signal, and a codec (e.g., the codec 360 of FIG. 3 or the codec 460 of FIG. 4) connected to the plug and the antenna signal receiver. The codec may be configured to recognize a connection of the connector for the electronic device to the plug, and convert an audio signal from the antenna signal receiver and transmit the converted audio signal to the electronic device connected through the plug.

According to various embodiments, a data signal line exists between the codec and the plug, and the antenna signal line and the data signal line are spaced apart from each other According to various embodiments, the audio signal received from the antenna signal receiver is an analog audio signal, and the codec may be configured to convert the analog audio signal into a digital audio signal, and transmit, to the electronic device, packet data including the converted digital audio signal.

According to various embodiments, the codec may be configured to when an antenna operation request signal is received from the electronic device activate the antenna signal receiver, convert an analog audio signal received from the activated antenna signal receiver into a digital audio signal, and transmit, to the electronic device, the converted digital audio signal.

According to various embodiments, when the antenna signal receiver receives an antenna operation request signal from the electronic device through a specific pin of the plug and the antenna signal receiver is activated, the codec may be configured to, transmit, to the electronic device, an audio signal received antenna signal receiver.

According to various embodiments, the audio signal received from the activated antenna signal receiver may include an analog audio signal, and the codec may be configured to convert the analog audio signal into a digital audio signal and transmit the converted digital audio signal to the electronic device as packet data.

According to various embodiments, the audio signal received from the codec is a digital audio signal converted by the codec.

Figure 6:
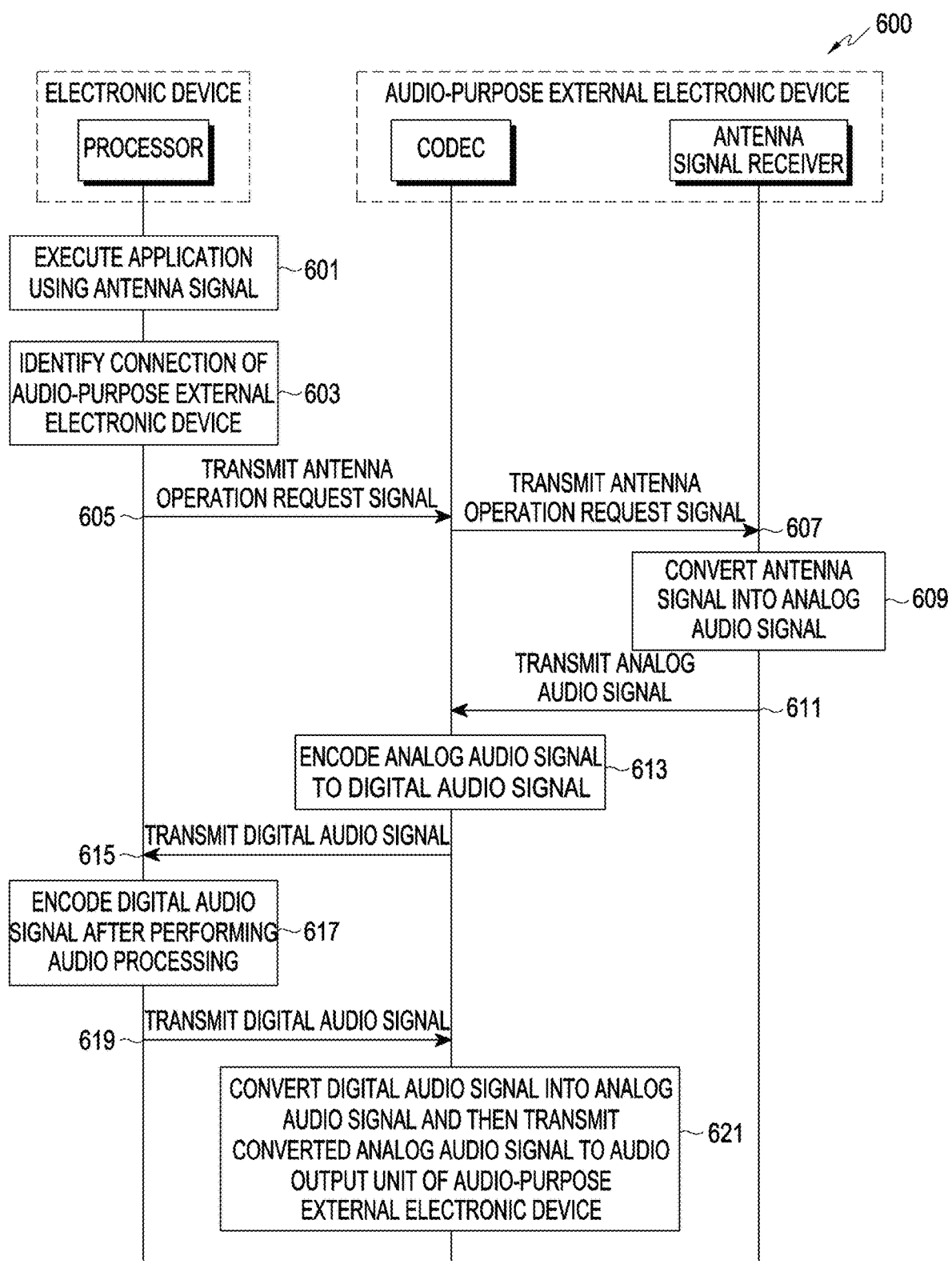
FIG. 6 is an exemplary flowchart illustrating an operation of receiving an antenna signal by an electronic device according to various embodiments.

FIG. 6 is an exemplary flowchart 600 illustrating an operation of receiving an antenna signal by an electronic device according to various embodiments. The operation of receiving an antenna signal may include operations 601 to 621. The operation of receiving the antenna signal may be performed by an electronic device (e.g., the electronic device 101 of FIG. 1), at least one processor (e.g., the processor 120 of FIG. 1) of the electronic device, the electronic device 201 of FIG. 2, the electronic device 301 of FIG. 3, or a processor (e.g., the processor 320 of FIG. 3) of the electronic device). According to an embodiment, at least one of operations 601 to 621 may be omitted, the order of some operations may be changed, or another operation may be added.

Referring to FIG. 6, in operation 601, a processor of an electronic device may identify execution of an application using an antenna signal among a plurality of applications of the electronic device.

In operation 603, the processor of the electronic device may identify a connection of an external audio device (e.g., the external audio device 210 of FIG. 2). According to an embodiment, if a resistance value indicating the external audio device is detected when the external electronic device is connected to a connector (e.g., the connector 310 of FIG. 3) of the electronic device, the processor may identify the connection of the external audio device to the connector (e.g., the connector 310 of FIG. 3).

In operation 605, the processor of the electronic device may transmit an antenna operation request signal for activation of an antenna signal receiver to a codec (e.g., the codec 360 of FIG. 3) of the external audio device (e.g., the external audio device 210 of FIG. 2). According to an embodiment, the processor may transmit an antenna operation request signal for activation of the antenna signal receiver to the codec (e.g., the codec 360 of FIG. 3) of the external audio device through data transmission/reception pins (e.g., D+ 317 and D− 319 of FIG. 3) among a plurality of pins included in the connector (e.g., the connector 310 of FIG. 3).

In operation 607, the codec (e.g., the codec 360 of FIG. 3) of the external audio device may transmit an antenna operation request signal for activation of the antenna signal receiver to the antenna signal receiver (e.g., the antenna signal receiver 350 of FIG. 3) of the external audio device.

In operation 609, the antenna signal receiver (e.g., the antenna signal receiver 350 of FIG. 3) of the external electronic device may be activated in response to the antenna operation request signal received from the codec (e.g., the codec 360 of FIG. 3), the activated antenna signal receiver may receive an antenna signal (e.g., an FM radio signal) through an antenna signal line (e.g., b1 of FIGS. 2B and 2C) included in a cable (e.g., the cable 211 of FIGS. 2B and 2C), and convert the received antenna signal into an analog audio signal (e.g., an FM audio digital signal).

In operation 611, the antenna signal receiver (e.g., the antenna signal receiver 350 of FIG. 3) of the external electronic device may transmit the converted analog audio signal to the codec (e.g., the codec 360 of FIG. 3).

In operation 613, the codec (e.g., the codec 360 of FIG. 3) of the external audio device may convert an analog audio signal received from the antenna signal receiver (e.g., the antenna signal receiver 350 of FIG. 3) into a digital audio signal (e.g., an FM audio digital signal), and encode the converted digital audio signal.

In operation 615, the codec (e.g., the codec 360 of FIG. 3) of the external audio device may transmit the encoded digital audio signal to the processor (e.g., the processor 320 of FIG. 3) of the electronic device as packet data. According to an embodiment, the codec (e.g., the codec 360 of FIG. 3) may transmit the encoded digital audio signal to the processor (e.g., the processor 320 of FIG. 3) of the electronic device through data transmission/reception pins (e.g., D+ 347 and D− 349 of FIG. 3) among a plurality of pins included in the plug 340 of the external audio device.

In operation 617, the processor of the electronic device may receive an encoded digital audio signal from the codec (e.g., the codec 360 of FIG. 3) of the external audio device. The processor may decode the received encoded digital audio signal and perform audio digital signal processing with respect to the digital audio signal, and then encode the digital audio signal.

In operation 619, the processor of the electronic device may transmit the encoded digital audio signal to the codec (e.g., the codec 360 of FIG. 3) of the external audio device. According to an embodiment, the processor may transmit the encoded digital audio signal to the codec (e.g., the codec 360 of FIG. 3) of the external audio device through the data transmission/reception pins (e.g., D+ 317 and D− 319 of FIG. 3) among the plurality of pins included in the connector (e.g., the connector 310 of FIG. 3).

In operation 621, the codec (e.g., the codec 360 of FIG. 3) of the external audio device may convert a digital audio signal received from the processor of the electronic device into an analog audio signal, and then transmit the converted analog audio signal to an audio output unit (e.g., the audio output unit 217 of FIG. 2) of the external audio device, so as to enable the audio output unit to output an audio signal.

Figure 7:
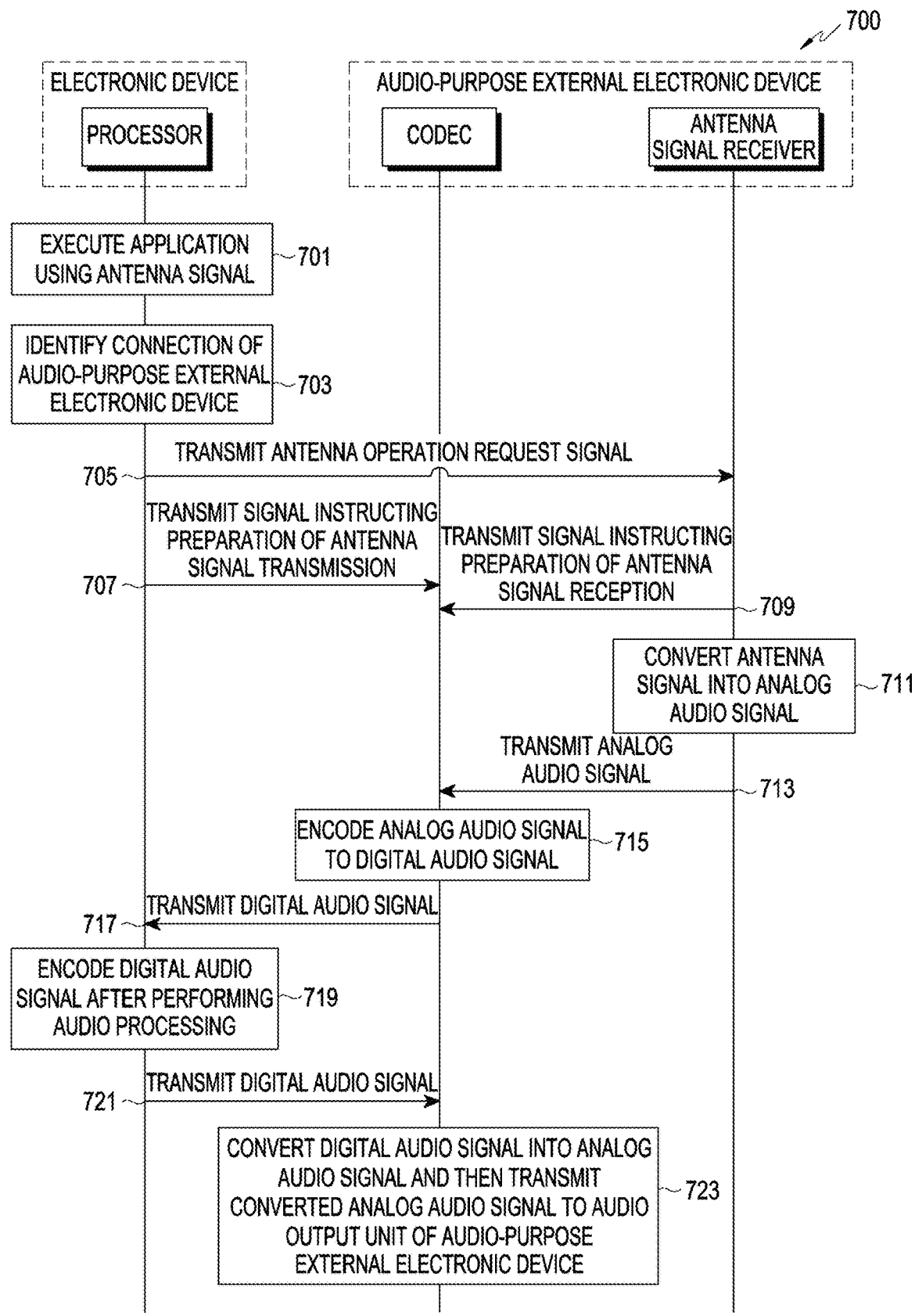
FIG. 7 is an exemplary flowchart illustrating an operation of receiving an antenna signal by an electronic device according to various embodiments.

FIG. 7 is an exemplary flowchart 700 illustrating an operation of receiving an antenna signal by an electronic device according to various embodiments. The operation of receiving an antenna signal may include operations 701 to 723. The operation of receiving the antenna signal may be performed by an electronic device (e.g., the electronic device 101 of FIG. 1), at least one processor (e.g., the processor 120 of FIG. 1) of the electronic device, the electronic device 201 of FIG. 2, the electronic device 401 of FIG. 4, or a processor (e.g., the processor 420 of FIG. 4) of the electronic device). According to an embodiment, at least one of operations 701 to 723 may be omitted, the order of some operations may be changed, or another operation may be added.

Referring to FIG. 7, in operation 701, a processor of an electronic device may identify execution of an application using an antenna signal among a plurality of applications of the electronic device.

In operation 703, the processor of the electronic device may identify a connection of an external audio device. According to an embodiment, if a resistance value indicating the external audio device (e.g., the external audio device 210 of FIG. 2) is detected when the external electronic device is connected to a connector (e.g., the connector 410 of FIG. 4) of the electronic device, the processor may identify the connection of the external audio device to the connector (e.g., the connector 410 of FIG. 4).

In operation 705, the processor of the electronic device may transmit an antenna operation request signal for activation of an antenna signal receiver to an antenna signal receiver (e.g., the antenna signal receiver 450 of FIG. 4) of the external audio device. According to an embodiment, the processor may transmit an antenna operation request signal for activation of the antenna signal receiver to a codec (e.g., the codec 460 of FIG. 4) of the external audio device through a specific pin (e.g., the SBU pin 411 of FIG. 4) among a plurality of pins included in the connector (e.g., the connector 410 of FIG. 4).

In operation 707, the processor of the electronic device may transmit a signal instructing the electronic device to prepare to transmit an antenna signal to the codec (e.g., the codec 460 of FIG. 4) of the external audio device after the operation 705 or at the same time as the operation 705.

In operation 709, the antenna signal receiver (e.g., the antenna signal receiver 450 of FIG. 4) of the external electronic device may transmit a signal instructing preparation of antenna signal reception to the codec (e.g., the codec 460 of FIG. 4) of the external audio device when the antenna signal receiver is activated in response to the antenna operation request signal received from the processor of the electronic device.

In operation 711, the antenna signal receiver (e.g., the antenna receiver 450 of FIG. 4) of the external electronic device may receive an antenna signal (e.g., an FM radio signal) through an antenna signal line, and convert the received antenna signal (e.g., an FM RF signal) into an analog audio signal.

In operation 713, the antenna signal receiver (e.g., the antenna signal receiver 450 of FIG. 4) of the external electronic device may transmit the converted analog audio signal to the codec (e.g., the codec 460 of FIG. 4).

In operation 715, the codec (e.g., the codec 460 of FIG. 4) of the external audio device may convert an analog audio signal received from the antenna signal receiver (e.g., the antenna signal receiver 450 of FIG. 4) into a digital audio signal, and encode the converted digital audio signal.

In operation 717, the codec (e.g., the codec 460 of FIG. 4) of the external audio device may transmit the encoded USB audio signal to the processor (e.g., the processor 420 of FIG. 4) of the electronic device. According to an embodiment, the codec (e.g., the codec 460 of FIG. 4) may transmit the encoded digital audio signal to the processor (e.g., the processor 420 of FIG. 4) of the electronic device through data transmission/reception pins (e.g., D+ 447 and D− 449 of FIG. 4) among a plurality of pins included in the connector 440 of the external audio device.

In operation 719, the processor of the electronic device may receive an encoded digital audio signal from the codec (e.g., the codec 460 of FIG. 4) of the external audio device. The processor may decode the received encoded digital audio signal and perform audio processing with respect to the digital audio signal, and then encode the digital audio signal.

In operation 721, the processor of the electronic device may transmit the encoded digital audio signal to the codec (e.g., the codec 460 of FIG. 4) of the external audio device. According to an embodiment, the processor may transmit the encoded digital audio signal to the codec (e.g., the codec 460 of FIG. 4) of the external audio device through data transmission/reception pins (e.g., D+ 417 and D− 419 of FIG. 4) among the plurality of pins included in the connector (e.g., the connector 410 of FIG. 4).

In operation 723, the codec (e.g., the codec 460 of FIG. 4) of the external audio device may convert a digital audio signal received from the processor of the electronic device into an analog audio signal, and then transmit the converted analog audio signal to an audio output unit (e.g., the audio output unit 217 of FIG. 2) of the external audio device, so as to enable the audio output unit to output an audio signal.

According to various embodiment, a method for receiving an antenna signal by an electronic device may include the operations of: identifying a connection of a plug of an external audio device including an antenna signal receiver (e.g., the antenna signal receiver 350 of FIG. 3 or the antenna signal receiver 450 of FIG. 4) to a connector (e.g., the connector 310 of FIG. 3 or the connector 410 of FIG. 4) of the electronic device; and receiving, through a data signal line connected to at least one pin of the connector, an audio signal from a codec (e.g., the codec 360 of FIG. 3 or the codec 460 of FIG. 4) connected to the antenna signal receiver in the external audio device connected to the connector.

According to various embodiments, the operation of receiving the audio signal may include the operations of: identifying execution of an application in the electronic device that uses the antenna signal, in response to identifying the execution of the application using the antenna signal, transmitting an antenna operation request signal to the codec such that the codec of the external audio device activates the antenna signal receiver of the external audio device to receive the antenna signal, and receiving, from the codec, the audio signal converted from the antenna signal by the antenna signal receiver.

According to various embodiments, the operation of receiving the audio signal may include the operations of: identifying execution of an application in the electronic device that uses the antenna signal, in response to identifying the execution of the application using an antenna signal, transmitting an antenna operation request signal to the antenna signal receiver through a specific pin of the connector in order to activate the antenna signal receiver of the external audio device; and receiving, from the coded, the audio signal.

According to various embodiments, the audio signal received from the codec may include a digital audio signal received as packet data, and the codec may convert an analog audio signal received from the antenna signal receiver into the digital audio signal.

According to various embodiment, operations of performing audio processing with respect to the received audio signal, and transmitting the audio signal on which the audio processing has been performed to the external audio device may be further included.

According to various embodiment, a method for transmitting an antenna signal by an external audio device may include the operations of: recognizing a connection of a connector for an electronic device removably coupled to a plug (e.g., the plug 340 of FIG. 3 or the plug 440 of FIG. 4) of the external audio device by a codec of the external audio device, the codec connected to the plug and antenna signal receiver of the external audio device, receiving, by the antenna signal receiver (e.g., the antenna signal receiver 350 of FIG. 3 or the antenna signal receiver 450 of FIG. 4), an antenna signal generated using an antenna signal line (e.g., b1 of FIGS. 2B and 2C) included in a cable (e.g., the cable 211 of FIGS. 2B and 2C) of the external audio device, the antenna signal line electrically connected between an antenna signal receiver and the audio output, and converting, by the antenna signal receiver, the received antenna signal into an audio signal, converting, by the codec, the audio signal from the antenna signal receiver and transmitting, by the codec, the converted audio signal to the electronic device through the plug.

According to various embodiments, the audio signal received from the antenna signal receiver may include an analog audio signal, and an operation of, by the codec, converting the analog audio signal into a digital audio signal and transmitting, to the electronic device by the codec, packet data including the converted digital audio signal.

According to various embodiment, the operation of transmitting to the electronic device may include the operations of: when an antenna operation request signal is received from the electronic device, activating, by the codec, the antenna signal receiver; and by the codec, converting an analog audio signal received from the activated antenna signal receiver into a digital audio signal and transmitting, to the electronic device by the codec, packet data including the converted digital audio signal.

According to various embodiment, the operation of when the antenna signal receiver receives an antenna operation request signal from the electronic device through a specific pin of the connector to activate the antenna signal receiver, transmitting to the electronic device may include an operation of, converting, by the codec, an analog audio signal from the activated antenna signal receiver into a digital audio signal and transmitting, to the electronic device by the codec, packet data including the converted digital audio signal. According to various embodiment, the audio signal received from the codec is a digital audio signal converted by the codec.

According to various embodiment, the data signal line exists between the codec and the plug, and the antenna signal line and the data signal line are spaced apart from each other.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In connection with a storage medium that stores commands, the commands may be configured to, when executed by at least one processor, cause the at least one processor to perform at least one operation. The at least one operation may include the operations of: identifying a connection of a plug of an external audio device including an antenna signal receiver to a connector of an electronic device; and receiving, through a data signal line connected to at least one pin of the connector, an audio signal from a codec connected to the antenna signal receiver in the external audio device. In connection with a storage medium that stores commands, the commands may be configured to, when executed by at least one processor, cause the at least one processor to perform at least one operation. The at least one operation may include the operations of: recognizing a connection of a connector for an electronic device removably coupled to a plug of the external audio device by a codec of the external audio device, the codec connected to the plug and antenna signal receiver of the external audio device, converting, by the antenna signal receiver, the received antenna signal into an audio signal; converting, by the codec, the audio signal from the antenna signal receiver; and transmitting, by the codec, the converted audio signal to the electronic device through the plug. In addition, the embodiments of the disclosure disclosed in the specification and drawings are only particular examples proposed in order to easily describe the technical content according to an embodiment of the disclosure and to help understanding of the embodiment of the disclosure, and are not intended to limit the scope of the embodiment of the disclosure. Therefore, the scope of various embodiments of the disclosure should be interpreted to include all changes or modified forms derived based on the technical spirit of various embodiments of the disclosure in the scope of various embodiments of the disclosure in addition to the embodiments described herein.

What is claimed is:

1. An electronic device comprising:
 a connector configured to removably couple with a plug of an external audio device;
 a data signal line connected to at least one pin of the connector;
 a processor; and
 memory storing instructions that, when executed by the processor, cause the electronic device to:
  identify a connection of the plug of the external audio device; and
  receive, through the data signal line, an audio signal from a codec connected to an antenna signal receiver in the external audio device,
 wherein the audio signal received from the codec of the external audio device includes a digital audio signal received as packet data, and
 wherein the digital audio signal is a signal that converts an analog audio signal received from the antenna signal receiver into an encoded digital audio signal by the codec of the external audio device.

2. The electronic device of claim 1, wherein the instructions, when executed by the processor, cause the electronic device to:
 identify execution of an application in the electronic device that uses an antenna signal,
 in response to identifying the execution of the application using the antenna signal, transmit an antenna operation request signal to the codec such that the codec of the external audio device activates the antenna signal receiver of the external audio device to receive the antenna signal, and
 receive, from the codec, the audio signal converted from the antenna signal by the antenna signal receiver.

3. The electronic device of claim 1, wherein the instructions, when executed by the processor, cause the electronic device to:
 identify execution of an application in the electronic device that uses an antenna signal,
 in response to identifying the execution of the application using the antenna signal, transmit an antenna operation request signal to the antenna signal receiver of the external audio device through a specific pin of the connector in order to activate the antenna signal receiver to receive the antenna signal, and receive, from the codec, the audio signal converted from the antenna signal of the antenna signal receiver.

4. A method for receiving an antenna signal by an electronic device, the method comprising:

identifying a connection of a plug of an external audio device comprising an antenna signal receiver to a connector of the electronic device; and receiving, through a data signal line connected to at least one pin of the connector, an audio signal from a codec connected to the antenna signal receiver in the external audio device, wherein the audio signal received from the codec of the external audio device includes a digital audio signal received as packet data, and wherein the digital audio signal is a signal that converts an analog audio signal received from the antenna signal receiver into an encoded digital audio signal by the codec of the external audio device.

5. The method of claim 4, wherein the receiving of the audio signal comprises:

identifying execution of an application in the electronic device that uses the antenna signal;

in response to identifying the execution of the application using the antenna signal, transmitting an antenna operation request signal to the codec such that the codec of the external audio device activates the antenna signal receiver of the external audio device to receive the antenna signal; and receiving, from the codec, the audio signal converted from the antenna signal by the antenna signal receiver.

6. The method of claim 4, wherein the receiving of the audio signal comprises:

identifying execution of an application in the electronic device that uses the antenna signal;

in response to identifying the execution of the application using the antenna signal, transmitting an antenna operation request signal to the antenna signal receiver through a specific pin of the connector in order to activate the antenna signal receiver of the external audio device; and receiving, from the codec, the audio signal.

* * * * *